United States Patent
Dengler

(10) Patent No.: US 6,432,301 B1
(45) Date of Patent: Aug. 13, 2002

(54) DEVICE FOR OBTAINING A DESALINATED SOLUTION

(76) Inventor: Hermann Dengler, Gartenstrasse 31, 71229 Leonberg (DE)

( * ) Notice: Subject to any disclaimer, the term of this patent is extended or adjusted under 35 U.S.C. 154(b) by 0 days.

(21) Appl. No.: 09/674,946

(22) PCT Filed: Apr. 30, 1999

(86) PCT No.: PCT/EP99/02939

§ 371 (c)(1),
(2), (4) Date: Nov. 3, 2000

(87) PCT Pub. No.: WO99/56860

PCT Pub. Date: Nov. 11, 1999

(30) Foreign Application Priority Data

May 4, 1998 (DE) .......................................... 198 196 20

(51) Int. Cl.$^7$ .............................................. B01D 61/06
(52) U.S. Cl. ........................ 210/97; 210/110; 210/136; 210/257.1; 210/195.2; 210/321.65; 210/321.66; 210/340; 210/416.3
(58) Field of Search ........................... 210/652, 321.66, 210/97, 110, 136, 137, 253, 257.1, 257.2, 258, 321.65, 321.72, 340, 406, 416.3, 900, 195.2, 321.84

(56) References Cited

U.S. PATENT DOCUMENTS 5,720,874 A * 2/1998 Siegler

FOREIGN PATENT DOCUMENTS

| DE | 39 14 940 A1 | 11/1990 |
|---|---|---|
| DE | 195 45 277 A1 | 6/1997 |
| SU | 152 85 27 A1 | 12/1989 |

OTHER PUBLICATIONS

Patent Abstracts of Japan, vol. 011, No. 300, (C–449), Sep. 29, 1987, JP 62 091204.

* cited by examiner

*Primary Examiner*—Joseph W. Drodge
*Assistant Examiner*—Terry K. Cecil
(74) *Attorney, Agent, or Firm*—Gudrun E. Huckett

(57) ABSTRACT

A device for producing a permeate from a concentrate has a separating chamber and a filter membrane dividing the separating chamber into a concentrate chamber and a permeate chamber. An inlet line is connected to the concentrate chamber and introduces the concentrate into the concentrate chamber. A concentrate line is branched off the concentrate chamber and has a control valve. A permeate line is branched off the permeate chamber. An accumulator is connected to the permeate line. A non-permeable separating membrane divides the accumulator into a storage chamber and a pressurized chamber, wherein the storage chamber is connected to the permeate line and the pressurized chamber is connected to the control valve of the concentrate line. The control valve is a jet nozzle and has a jet head, wherein the concentrate line opens into the jet head. An outlet concentrate line is connected to the jet nozzle opposite the concentrate line at a spacing to the jet head, wherein the jet head of the nozzle issues an accelerated exit jet entering the outlet concentrate line. The jet nozzle has an under pressure chamber surrounding the exit jet. A suction line branches off the under pressure chamber of the jet nozzle and is connected to the pressurized chamber.

14 Claims, 2 Drawing Sheets

DEVICE FOR OBTAINING A DESALINATED SOLUTION

BACKGROUND OF THE INVENTION

1. Field of the Invention

The invention relates to a device for obtaining a permeate from a concentrate, in particular, raw water comprised of a separating chamber which is divided by a filter membrane into a concentrate chamber and a permeate chamber with an inlet line opening into the concentrate chamber for the concentrate and a concentrate line branched off the concentrate chamber as well as a permeate line branching off the permeate chamber, to which is connected an accumulator which is divided by a non-permeable separating membrane into a storage chamber and a pressurized chamber, wherein the storage chamber is connected to the permeate line and the pressurized chamber is connected via a control valve to the concentrate line.

2. Description of the Related Art

Especially in areas close to the ocean, the raw water provided to households has a high salt content based on which all needs in regard to the use of the raw water cannot be satisfied. The thus required treatment of the raw water is carried out in devices which have a separating chamber with a membrane module which by means of a separation method such as, for example, reverse osmosis divides the raw water into a concentrated solution (concentrate) and a desalinated solution (permeate). The salt molecules of the raw water in this case cannot overcome the osmotic membrane even under pressure and remain thus in the concentrate. Accordingly, the permeate filtered through the membrane remains substantially free of salt molecules.

From DE 39 14 940 A1 a device of the aforementioned kind for treatment of raw water is known. By means of switchable valves permeate is obtained when removing raw water which, with displacement of filling water, flows into an accumulator. For the removal of permeate, several valves must be switched which is technically complex and cumbersome. In this connection, the raw water line is connected with the filling water volume so that the permeate flows out of the accumulator substantially under the line pressure. The permeate is generated in the low-pressure range which results in only a minimal permeate yield.

Reverse osmosis in the low-pressure range is also used in the device according to DE 195 45 277 A1 which has the consequence that the permeate yield is low in comparison to the concentrate. As demonstrated in practice, in the low-pressure range 5–20% of the supplied raw water is obtained as permeate. This permeate flows into a permeate storage device which must be designed such that it can also cover a discontinuous increased permeate demand. The minimal permeate yield results in that the concentrate differs with regard to quality only minimally from the raw water and can thus be used for many applications in the household such as washing dishes and cleaning without reservations. As a result of the minimal permeate yield in the low-pressure range a large amount of raw water is required which usually flows out as waste water without having been used.

From Japanese laid open patent JP-62-91204 it is known to arrange an outflow vessel at the filter outlet for enhancement of the filter output whose airspace above the liquid level is loaded by under pressure by means of a jet pump. The jet pump is arranged within the concentrate circuit which is also operated by a pump.

SUMMARY OF THE INVENTION

It is an object of the invention to further develop a device of the aforementioned kind such that the production and making available of permeate, for example, as drinking water, is possible with minimal energy consumption and raw water use.

The object is solved according to the invention in that the concentrate line opens into the jet head of a jet nozzle whose accelerated exit jet enters into an outlet concentrate line positioned at a distance opposite thereto, and in that a suction line is branched off an under pressure chamber of the jet nozzle surrounding the exit jet and is connected with the pressurized chamber.

The selection of an accumulator whose pressurized chamber is connected with the concentrate line by a jet nozzle combines storage and conveyance of the permeate in the permeate network within a single device. In this connection, the under pressure or over pressure in the pressurized chamber is derived solely from the water supply network. The alternating switching between generation of an under pressure or an over pressure is realized by the user when selecting concentrate consumption or permeate consumption.

When concentrate is being consumed, the concentrate flows from the concentrate chamber of a separating chamber and reaches via a concentrate line a jet head of the jet nozzle. The accelerated exit jet generates upon entering a line positioned opposite the jet head at a spacing thereto a pressure drop in its immediate vicinity. The coupling of the under pressure chamber of the jet nozzle comprising the exit jet to the pressurized chamber of the accumulator makes it possible to employ this pressure drop as a suction effect. Upon simultaneous outflow of the concentrate, the pressurized chamber of the accumulator which is coupled with the jet nozzle and is filled correspondingly with the concentrate, is emptied by suction. Since the pressure membrane of the accumulator yields to the pressure, the suction effect is transmitted onto the oppositely positioned chamber which is connected via the permeate line with the permeate chamber of the separating chamber and thus increases the pressure gradient via the membrane and thus also the permeate yield. The emptying of the pressurized chamber of the accumulator filled with concentrate is coupled with the filling of the oppositely positioned storage chamber with the permeate. Solely by the pressure which is present within the water supply network of the water supply line, the under pressure in the accumulator is achieved without additional pump devices.

The connection of the permeate chamber of the separating chamber with the accumulator makes an increase of the permeate yield possible. When an under pressure is present in the accumulator, the permeate is sucked in from the permeate chamber of the separating chamber. The under pressure in the accumulator is distributed within the permeate chamber and increases the efficiency of the separating membrane in the separating chamber. The concentrate can further be used as general use water because the separation is carried out in the low-pressure range. The concentrate differs slightly from the raw water and can therefore be used without problems for flushing processes in the household. During consumption of concentrate or raw water, the permeate is produced and collected in the accumulator. When the permeate is used in the household, the user switches the mixed water faucet to the permeate line. The accumulator in emptied from the permeate contained in the storage chamber, additionally enhanced by the static over pressure of the concentrate, which is built up within the accumulator via the concentrate line connected to the jet nozzle.

According to a further development of the invention, an additional separating chamber is connected to the concentrate line downstream of the jet nozzle. Its corresponding permeate chamber is connected with the storage chamber of the accumulator. Operating this additional separating chamber is realized by means of controlling an inlet valve which is mounted in the concentrate line for supplying the separating chamber. The control is connected with a switching contact connected with the pressurized chamber which controls opening of the inlet valve as a function of the filling amount in the storage chamber. For this purpose, a magnet is mounted on the pressure membrane at the side of the storage chamber via which a switching contact can be actuated in a contactless way for switching the inlet valve when an increased permeate demand is present.

BRIEF DESCRIPTION OF THE DRAWINGS

In the drawing one embodiment of the invention explained in the following is schematically illustrated. It is shown in.

DESCRIPTION OF THE PREFERRED EMBODIMENTS

Figure 1:
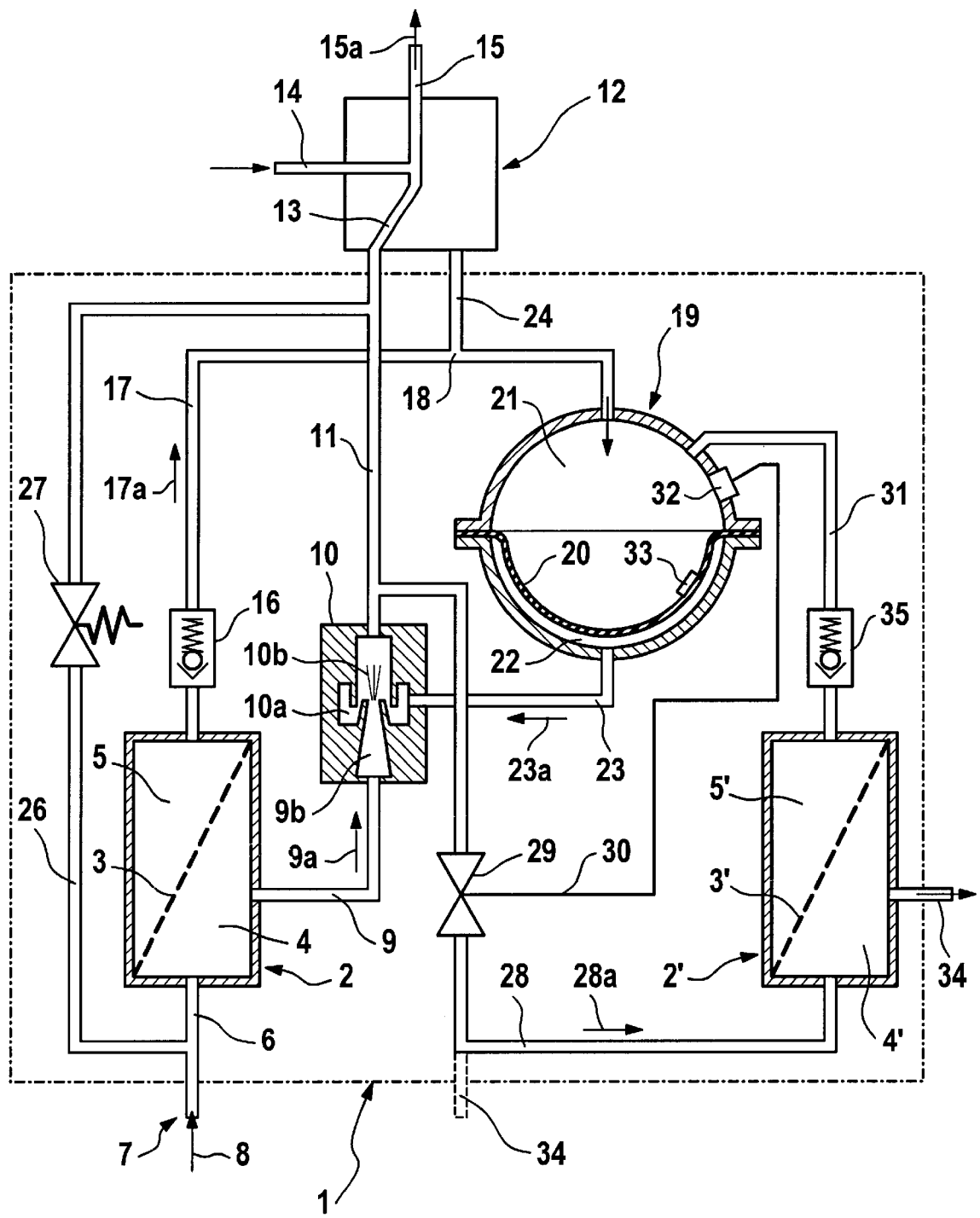
FIG. 1 a schematic illustration of a device for producing permeate with outflowing concentrate.
Figure 2:
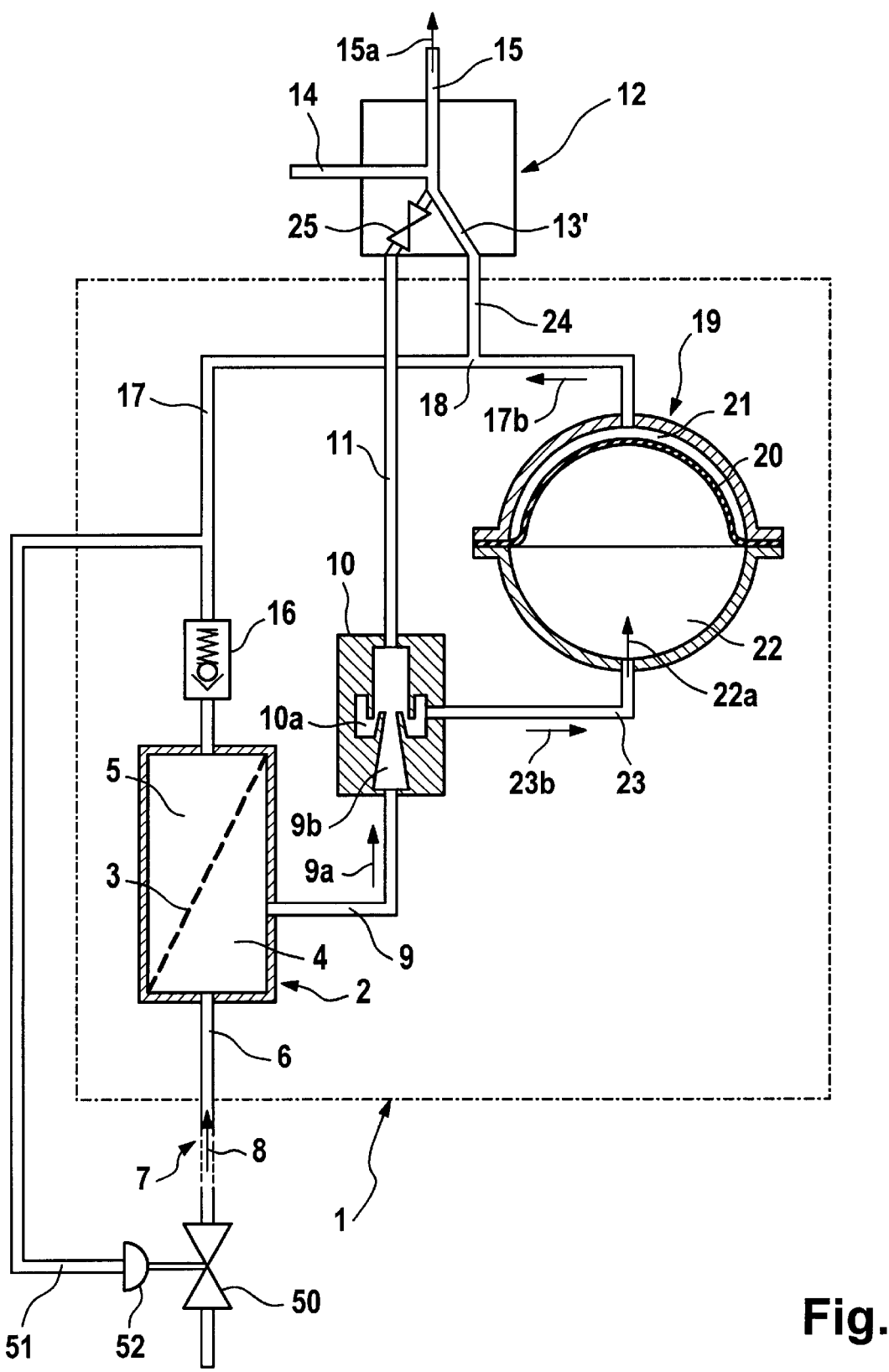
FIG. 2 a schematic illustration of a device for producing permeate with outflowing permeate.

The device 1 for producing permeate and schematically illustrated in FIGS. 1 and 2 comprises a separating chamber 2 formed as a membrane module which is divided by an separating membrane 3 into a concentrate chamber 4 and a permeate chamber 5. The concentrate chamber 4 is connected by means of an inlet line 6 with a water supply network 7 via which the volume flow of raw water flows in the direction of arrow 8.

A concentrate line 9 branches off the concentrate chamber 4 and opens into a jet head 9b a of a jet nozzle 10. Opposite the jet head 9b a line 11 is present which is conducted to the fixture 12, for example, a mixed water faucet. When the switching section 13 of the fixture 12 is switched to the concentrate line 11, the concentrate flows in the direction of arrow 9a out of the jet head 9b into the oppositely positioned concentrate line 11.

The permeate chamber 5 is connected by means of a permeate line 17 with an accumulator 19. The check valve 16 arranged therebetween protects the separating membrane 3 of the separating chamber 2 against counter pressures. It allows only outflow of the permeate from the permeate chamber into the permeate line 17 according to the direction of arrow 17a.

In the accumulator 19 the permeate chamber 21 provided for the permeate is delimited by a non-permeable pressure membrane 20. The remaining pressurized chamber 22 of the accumulator 19 is connected by a line 23 via the jet nozzle 10 with the concentrate line 9.

When consuming concentrate or raw water, under pressure results in the space 10a of the jet nozzle 10 surrounding the exit jet 10b and sucks in the raw water 22 from the accumulator 19 via the line 23 in the direction of arrow 23a. Via the pressure membrane 20 an under pressure is built up in the permeate chamber 21 of the accumulator 19 so that the permeate is sucked in via the permeate line 17.

Accordingly, the accumulator 19 is filled with permeate while the concentrate flows out.

The separating membrane to be provided in the separating chamber 2 is selected according to the operational conditions with regard to the separating quality. For example, a reverse osmosis membrane, a nanofiltration membrane, an ultrafiltration membranes or a microfiltration membrane can be used. They all operate in the low-pressure range. In the concentrate chamber 4 preferably a maximum pressure which is the same as in the water supply network 7 is present. Despite the low-pressure of less than 10 bar, expediently 2 to 4 bar, a sufficient permeate yield is obtained. The predominant part of the raw water, flowing in via the inlet line 6, flows out of the water faucet 15 via the concentrate lines 9 and 11 in the direction of arrow 15a. Even the increased permeate yield still allows the use of concentrate as general use water. Should there be an increased demand of raw water, via an inlet line 26 additional raw water can be supplied and metered by an inlet valve 27.

There is also a possibility provided to mix hot water with raw water by connecting a hot water line 14 to the fixture 12.

For the consumption of permeate, the armature or fixture 12 is moved into the switching position 13', for example, by turning the mixed water faucet. In this switched position the concentrate line 11, optionally with the aid of an inlet valve 25, is closed and the line 24 is connected by the branch line 18 with the permeate line 17. Since water flows still from the water supply network 7 in the direction of arrow 8 into the concentrate chamber 4, the concentrate will flow from the jet head 9b into the chamber 10a of the jet nozzle 10 and via the line 23 in the direction of arrow 23b into the accumulator 19. The pressure of the water supply network 7, which is built up via of the concentrate line 9 and line 23, acts in the direction of arrow 22a onto the pressure membrane 20. The permeate in the accumulator 19 flows under the pressure of the water supply network 7 via the permeate line 17 in the direction of arrow 17b to the branch line 18 and via the line 24 to the water faucet 15. With the arrangement of a check valve 16 at the exit of the permeate chamber 5 it is prevented that permeate can flow back into the permeate chamber 5. Up to the point of complete emptying of the accumulator 19 the concentrate continues to flow into the pressurized chamber 22.

Once the consumer has removed a sufficient amount of permeate or once the accumulator 19 is empty, the consumer will close the fixture 12 or switch back to previous switching position 13. When opening the water faucet 15, concentrate will flow again.

In order to cover cases of increased permeate consumption, an additional separating chamber 2' can be connected to the concentrate line by means of an additional concentrate line 28 downstream of the jet nozzle 10. The inflowing volume flow of the concentrate, flowing in the direction of arrow 28a, is controlled by an inlet valve 29 arranged in the additional concentrate line 28. The separating chamber 2' is divided by a separating membrane 3' into a concentrate chamber 4', to which is connected a wastewater line 34, and a permeate chamber 5'. The permeate chamber 5' is protected against counter pressures by a check valve 35 and connected by a line 31 with the permeate chamber 21 of the accumulator 20. The inlet valve 29 is connected by a control line 30 with a switching contact at the sidewall of the permeate chamber 21. On the pressure membrane 20 a magnet 33 is arranged at the side of the storage chamber 21 which actuates the switching contact 32. The opening of the inlet valve 29 is realized as a function of the filling level in the permeate chamber 21. Starting at a certain removal quantity, the magnet 33 reaches the vicinity of the switching contact 32 and effects in a contactless way the switching of the inlet valve 29. The switching point is determined by the arrangement of the switching contact 32 and of the magnet 33. The opening of the inlet valve 29 results in a supplemental production of permeate via the additional separating chamber 2'. The concentrate flows out via the wastewater line 34.

Optionally, the additional concentrate line 28 can also open downstream of the inlet valve 29 directly into a wastewater line 36. Due to the outflow of concentrate, raw water flows into the concentrate chamber 4 and via the jet nozzle 10 into the additional line 28 so that permeate is produced in the separating chamber 2.

The arrangement of a jet nozzle 10 has the advantage that the permeate can be produced, stored, and conveyed only by the pressure which is made available through the water supply network 7. No additional energy for a pressure increases required.

The device 1 according to the invention can be adapted to the typical conditions of a household in that the separating chamber and the accumulator 19 can be accordingly sized in order to cover the daily permeate demand. As illustrated in FIGS. 1 and 2, the device 1, comprised of the separating chamber 2, the jet nozzle 10, the accumulator 9, and optionally the additional separating chamber 2' with the connecting lines, respectively, is embodied as a construction module, which is arranged in the completely mounted state at the location of use, for example, underneath a kitchen sink. For beginning operation of the device 12, the inlet line 6 must be connected to the water supply network and the lines 11 and 24 to the fixture 12.

For controlling the concentrate inflow 6, a pressure-controlled valve 50 can be provided whose actuation unit 52 is controlled via a pressure line 51 by the pressure in the permeate line 17. When in the permeate line 17 a pressure is generated, the inlet valve 50 is closed upon reaching a threshold value. When a pressure drop occurs in the permeate line 17, which can happen, for example, when opening the fixture 12, the inlet valve 50 is opened again and the separating chamber 2 begins to operate again.

What is claimed is:

1. A device for producing a permeate from a concentrate, said device comprising:

a separating chamber (2);

a filter membrane (3) dividing said separating chamber (2) into a concentrate chamber (4) and a permeate chamber (5);

an inlet line (6) connected to said concentrate chamber (4) and configured to introduce the concentrate into said concentrate chamber (4);

a concentrate line (9) branched off said concentrate chamber (4) and comprising a control valve (10);

a permeate line (17) branched off said permeate chamber (5);

an accumulator (19) connected to said permeate line (17);

a non-permeable separating membrane (20) dividing said accumulator (19) into a storage chamber (21) and a pressurized chamber (22), wherein said storage chamber (21) is connected to said permeate line (17) and said pressurized chamber (22) is connected to said control valve (10) of said concentrate line (9);

said control valve (10) being a jet nozzle and having a jet head (9b), wherein said concentrate line (9) opens into said jet head (b);

an outlet concentrate line (11) connected to said jet nozzle (10) opposite said concentrate line (9) at a spacing to said jet head (9b), wherein said jet head (9b) of said nozzle (10) issues an accelerated exit jet (10b) entering said outlet concentrate line (11);

said jet nozzle (10) having an under pressure chamber (10a) surrounding said exit jet (10b);

a suction line (23) branched off said under pressure chamber (10a) of said jet nozzle (10) and connected to said pressurized chamber (22).

2. The device according to claim 1, wherein the pressure in said pressurized chamber (22) is within a low-pressure range.

3. The device according to claim 1, comprising a common fixture (12) for dispensing the permeate and the concentrate and comprising an outlet permeate line (24) branched off said permeate line (17), wherein said concentrate line (11) and said outlet permeate line (24) open into said common fixture (12) which comprises a water outlet (15).

4. The device according to claim 3, comprising a hot water line (14) opening into said fixture (12), wherein said hot water line (14) can be coupled to an outlet of said water outlet (15).

5. The device according to claim 1, comprising a check valve (16) arranged between said permeate chamber (5) and said storage chamber (21) and opening in a direction toward said storage chamber (21).

6. The device according to claim 1, wherein said inlet line (6) is a line of a water supply network (7) and wherein maximally a water pressure of said supply network (7) is present in said concentrate chamber (4).

7. The device according to claim 1, comprising an additional separating chamber (2') with a filter membrane (3') dividing said additional separating chamber (2') into an additional concentrate chamber (4') with an additional concentrate line (28), having an inlet valve (29) and being connected to said outlet concentrate line (11), and into an additional permeate chamber (5') having an additional permeate line (31) connected to said storage chamber (21), wherein said additional concentrate chamber (4') has a branched-off wastewater line (34), and wherein a volume flow of the concentrate flowing in said additional concentrate line (28) into said additional permeate chamber (4') is controlled by said inlet valve (29).

8. The device according to claim 7, comprising a switching contact (32) arranged at an outer side of said storage chamber (21) and having a control line (30) coupling said switching contact (32) to said inlet valve (29), wherein said switching contact (32) opens or closes said inlet valve (29) as a function of a filling level of said storage chamber (21).

9. The device according to claim 8, comprising a magnet (33) mounted on said separating membrane (20), wherein said switching contact (32) is switched by said magnet (33) in a contactless way, wherein a position of at least one of said magnet (33) and said switching contact (32) is based on a desired filling level of said storage chamber (21).

10. The device according to claim 7, wherein said filter membrane (3, 3') of said separating chamber (2) and said additional separating chamber (2') are selected from the group consisting of a reverse osmosis filtration membrane, a nanofiltration membrane, an ultrafiltration membrane, and a microfiltration membrane.

11. The device according to claim 7, wherein said separating chamber (2), said permeate line (17), said accumulator (19), said jet nozzle (10), and said additional separating chamber (2') are combined in a construction module (1).

12. The device according to claim 1, wherein said separating chamber (2), said permeate line (17), said accumulator (19), and said jet nozzle (10) are combined in a construction module (1).

13. The device according to claim 1, comprising a direct connection (26) with an inlet valve (27) branching off said inlet line (6) to said outlet concentrate line (11).

14. The device according to claim 1, comprising a common fixture (12) for dispensing the concentrate and the permeate, wherein said fixture (12) has a control valve (25) configured to mix the concentrate into the permeate.

* * * * *